United States Patent [19]

O'Neil

[11] Patent Number: 4,535,560

[45] Date of Patent: Aug. 20, 1985

[54] DUCK DECOY MOVEMENT APPARATUS

[75] Inventor: Jack O'Neil, Baton Rouge, La.

[73] Assignee: Roy & Kiesel, Baton Rouge, La.

[21] Appl. No.: 424,074

[22] Filed: Sep. 27, 1982

[51] Int. Cl.³ ............................................ A01M 31/06
[52] U.S. Cl. ......................................................... 43/3
[58] Field of Search ................ 43/2, 3, 26.1; 273/350, 273/366

[56] References Cited

U.S. PATENT DOCUMENTS 3,016,647  1/1962  Peterson et al. ............................ 43/3

FOREIGN PATENT DOCUMENTS 961524  6/1964  United Kingdom ................. 254/362

Primary Examiner—Gene P. Crosby
Assistant Examiner—P. Weston Musselman, Jr.
Attorney, Agent, or Firm—William David Kiesel

[57] ABSTRACT

An apparatus for controlling the movement of a group of duck decoys having a decoy support frame attached at one end to an anchored elastic band and at its other end to a line which is attached to a reel and motor. Movement of the decoys is controlled by a voltage controlled timer which turns on and off at variable time intervals. The voltage is generated by the backspin on the motor shaft caused by contraction of the elastic band which has been stretched while the motor is turned on.

5 Claims, 8 Drawing Figures

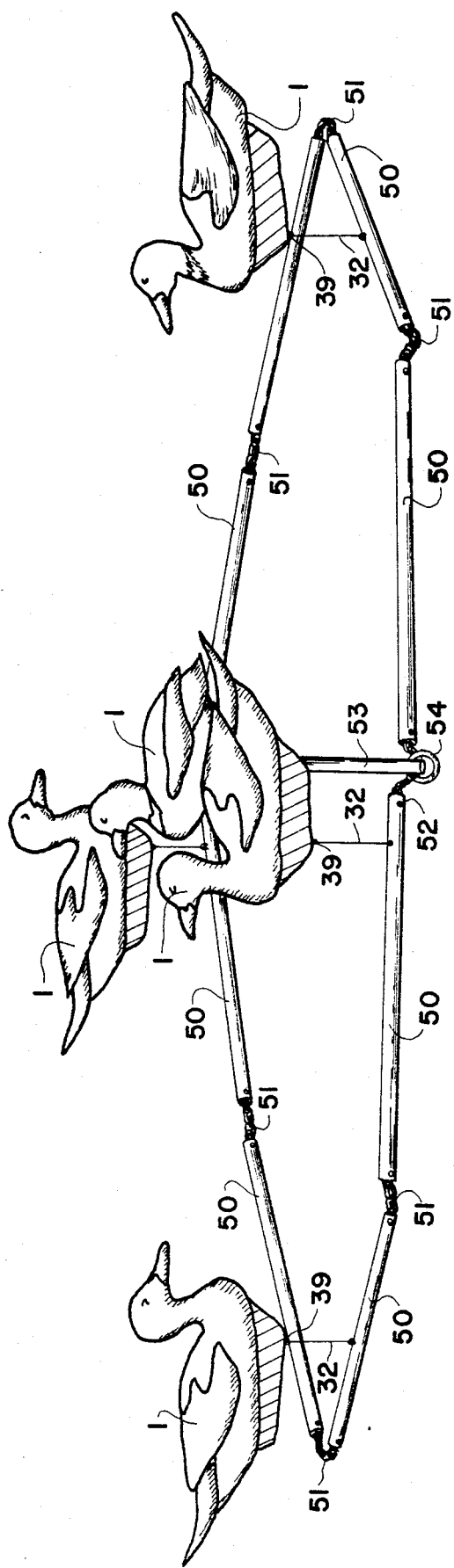
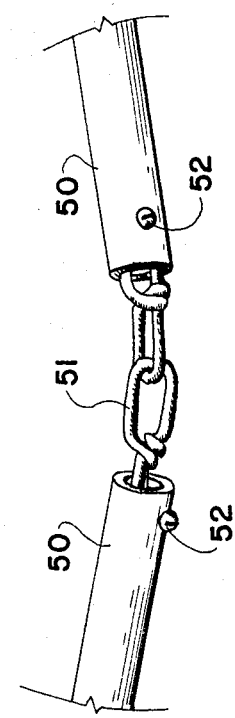
FIGURE 5
FIGURE 7
FIGURE 6

DUCK DECOY MOVEMENT APPARATUS

BACKGROUND OF THE INVENTION

1. Field of the Invention

This invention relates to duck decoys, and more particularly to an apparatus for creating duck-like swimming motions to decoys floating in water.

2. Prior Art

One of the principal difficulties for duck hunters is to create a hunting site that appears natural and inviting to ducks. For this reason, the construction of duck blinds is carefully done to make them appear natural yet hide the hunter. As part of this setting it is common practice to float decoys about the blind. Great strides have been made in the physical appearance of the decoys to make them look like real ducks. However, the problem of making the decoys move about in the water as real ducks remains.

SUMMARY OF THE INVENTION

Therefore, it is an object of this invention to provide means which cause floating decoys to simulate the natural movement of swimming ducks.

Another object of this invention is to provide those means which can be hidden from sight and which does not inhibit the actions of the hunter.

Still other objects and advantages of this invention shall become apparent from the ensuing descriptions of this invention.

Accordingly, an apparatus for creating life-like movements in floating decoys is provided comprising a submersible frame to which the decoys are attached by flexible lines, an elastic band anchored at one end and attached to one end of the frame, and a reeling means controllable by a hunter having a reelable line attached to an opposite end of the frame.

BRIEF DESCRIPTION OF THE DRAWINGS

FIG. 5 is an alternate embodiment of the submersible frame used with this invention.

FIG. 6 is a preferred embodiment of means to connect the frame cross member.

FIG. 7 is a preferred embodiment illustrating the connection of the frame members.

PREFERRED EMBODIMENTS OF THE INVENTION

Figure 1:
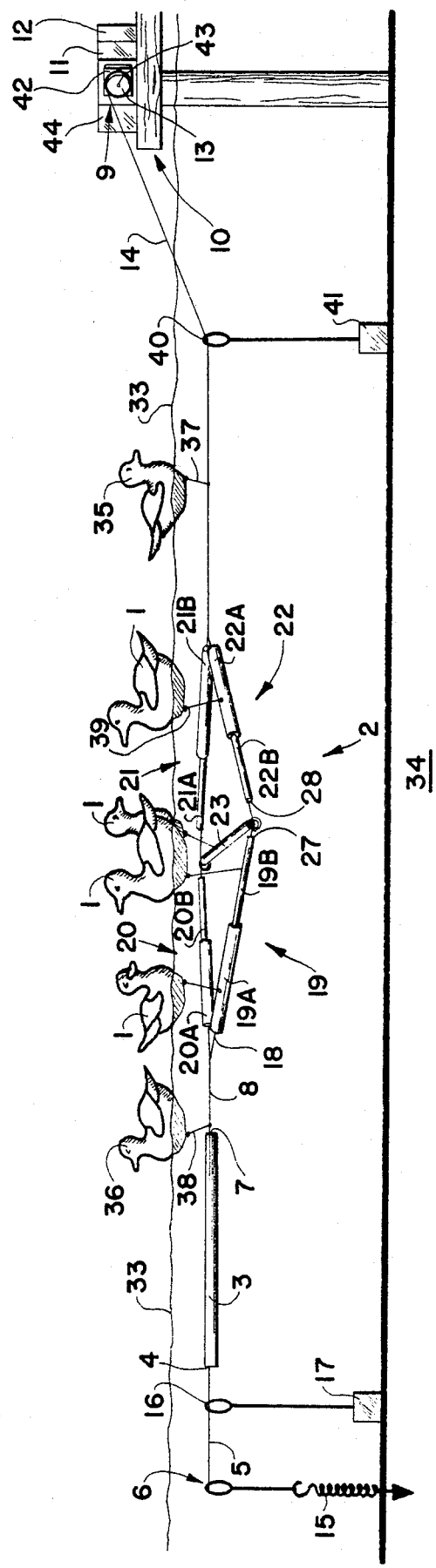
FIG. 1 is a three-dimensional view of a preferred embodiment of the apparatus of this invention with decoys attached.

Referring now to FIG. 1, a preferred embodiment of an apparatus for creating life-like movements in duck decoys 1 floating in water is illustrated. In general, the apparatus comprises a submersible frame 2; an elastic band 3 anchored at one end 4 by flexible line 5 attached to weight 6 and attached at the other end 7 to frame 2 by flexible line 8; and a reeling assembly 9 positioned at duck blind 10 comprising a DC motor 11 powered by battery 12 and having a pulley reel 13 to which reel line 14 is attached at one end and to frame 2 at its opposite end.

In a preferred embodiment anchor 6 comprises an auger end 15 to allow fixing in water bottoms, as well as, dry land. In another preferred embodiment eyelets 16 fixed to weights 17 are positioned between auger 15 and elastic band end 4 through which line 5 passes. These eyelets 16 help guide line 5 and prevent fouling with underwater obstacles.

Frame 2 is preferably constructed from light weight materials such as aluminum or plastic to facilitate carrying to blind 10. In one preferred embodiment illustrated in FIG. 1, frame 2 is constructed by tying together with line 18 aluminum tubular members 19-23 to form a rectangle-shaped structure that allows frame 2 to be folded when not in use.

Figure 2A:
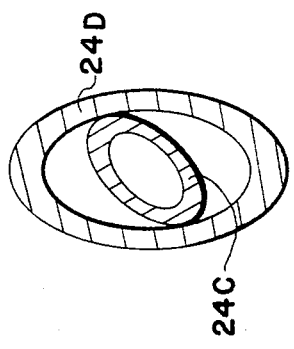
FIG. 2A is a cross sectional view taken along lines II—II of FIG. 2.
Figure 2:
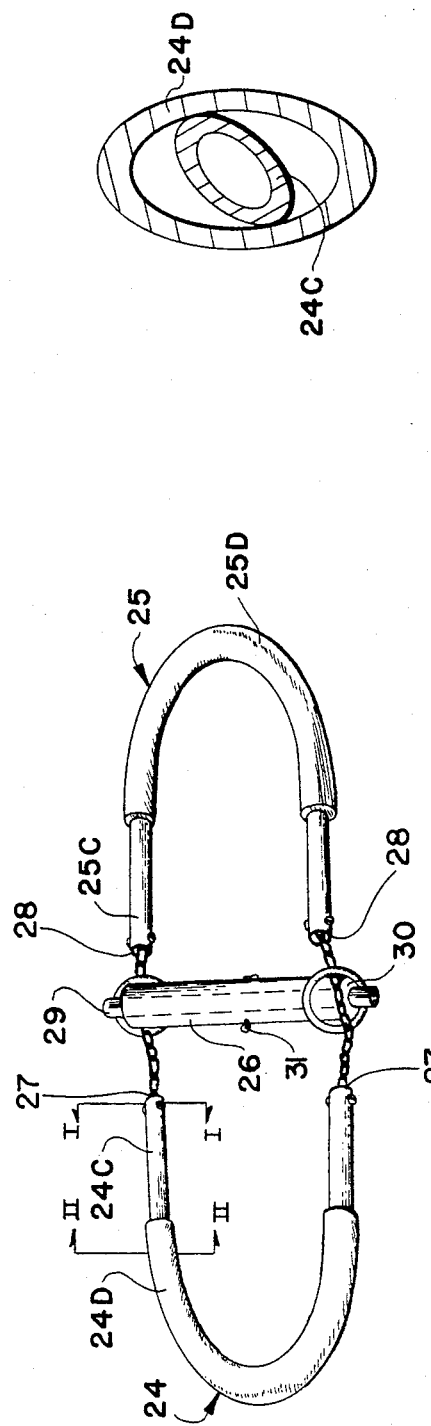
FIG. 2 is a three-dimensional view of a preferred embodiment of the frame illustrating its collapsible feature.
Figure 3:
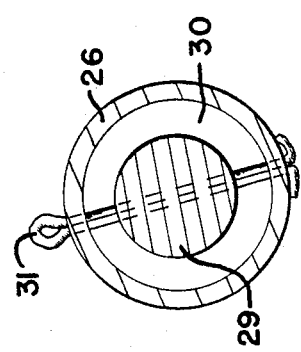
FIG. 3 is a cross-sectional view taken along lines I—I of FIG. 2.

Referring now to FIGS. 1-3, an alternate preferred embodiment of frame 2 is illustrated comprising two arcuate-shaped members 24 and 25 hinged together at their ends and having a supporting member 26 extending between ends 27 and 28. Member 26 is held in position by rod 29 extending through opening 30. Rod 29 can be maintained in position by collar pins 31. For storage or carrying purposes it is preferred that members 19-23 each be constructed of two pieces "a" and "b" which having mating threaded ends that can be unscrewed. In an alternate preferred embodiment as illustrated in FIG. 2, members 24 and 25 have smaller diameter end pieces "c" that telescope into arcuate piece "d" and lock into place by twisting in a conventional fashion.

In either embodiment of frame 2, decoys 1 are attached by fishing line 32 at desired positions about frame 2. In a preferred embodiment lines 32 are of equal length to maintain frame members 19-23 or 24-25 parallel to the water's surface 33 and above the water bottom 34. In another preferred embodiment lead and trail decoys 35 and 36, respectively, are attached to line 14 and 8, respectively. In this embodiment, it is especially preferred that attaching lines 37 and 38 be longer than lines 32 to create a delayed action by decoys 35 and 36 when reel line 14 is first reeled in or out. To help prevent fouling and to assist in smooth circular motion of decoys when the decoy movement direction is changed, swivel connections 39 are attached to the upper end of lines 32, 37 and 38. Swivel connections 39 are then attached to decoys 1, 35 and 36.

In another preferred embodiment, lead guide eyelet 40 held in position by weight 41 is placed between frame 2 and reeling assembly 9 to ensure the proper directional movement of the decoys and to prevent line fouling.

Figure 4:
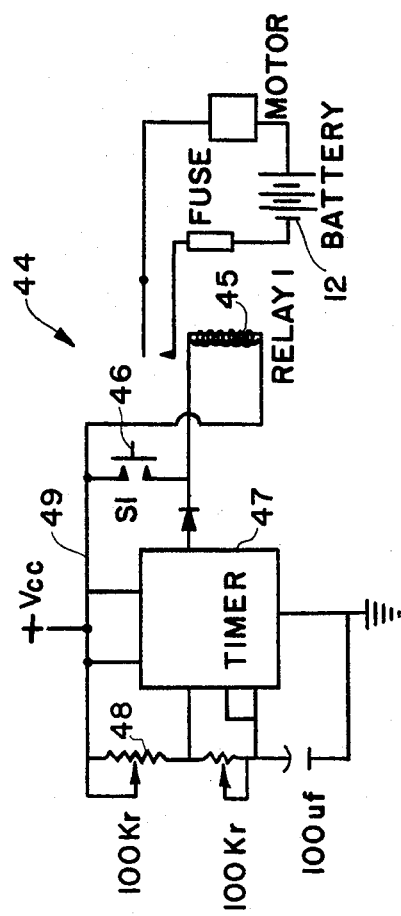
FIG. 4 is an electrical schematic illustrating the preferred embodiments of an automatic motor control for use with this invention.

Referring now to FIGS. 1 and 4 reeling assembly 9 comprises a lightweight small horsepower (1/10-¼ H.P.) motor 11 having conventional gear reduction assembly 42 with reel shaft 43 attached to pulley reel 13. To achieve the desired decoy motion, reel 13 should be relatively small, preferably no larger than 5" in diameter. In a particularly preferred embodiment, battery 12 is electrically connected to a timer assembly 44, more preferably a variable timer assembly, in order to turn on and off motor 11 at pre-determined time intervals in order to achieve the varied decoy movements desired.

In an alternate embodiment, the hunter can manipulate the decoy assembly simply by pulling on line 14 by hand.

FIG. 4 discloses a particularly preferred timer assembly 44 that achieves a varied time delay sequence. In this embodiment, battery 12 is connected in series to electrical relay 45 that closes when switch 46 is closed. The voltage to timer 47 can be varied by variable resister 48. In this embodiment it has been found that after line 14 has been initially reeled in and motor 11 cuts off that the backspin caused when elastic band 3 contracts creates sufficient voltage leading from line 49 to timer 47, that timer 47 shortens its timing cycle. This results in varied timing cycles and consequently into the desired varied decoy movement.

It is, of course, desireable that the reeling assembly be housed in a sound insulated box so as not to distract or scare ducks approaching the decoys.

In an alternate preferred embodiment shown in FIGS. 5-7, member frame 2 comprises tubing member 50 connected to one another by chain links 51 that are attached to members 50 by bolts 52. Cross tubing member 53 is provided with a ring 54 attached to either end of member 53 and which passes through one of the chain links 51 as shown. This embodiment is not only light but is easily foldable into a compact bundle for easy carrying. These and other embodiments not specifically described are intended to be included in the scope of the invention as defined by the following claims.

What I claim is:

1. An apparatus for creating life-like movements in floating decoys comprising:
   (a) a submersible frame comprising two arcuately-shaped tubular members hingedly connected to one another at their ends to which said decoys are attached by flexible lines,
   (b) an elastic band anchored at one end away from said frame, said band being attached at its opposite end to said frame, and
   a motor having a reel attached to a shaft of said motor for reeling in and out a reel line attached at one end to said frame and attached at is opposite end to said reel, wherein said motor is provided which turn said motor on and off at time intervals which are vareid by voltage to said timers, said voltage being generated by the backspin on said motor shaft caused by the contraction of said elastic band.

2. An apparatus according to claim 1 wherein said time intervals are between 5 and 15 seconds.

3. An apparatus according to claim 1 wherein said tubular members each comprise multiple segments flexibly attached together.

4. An apparatus for creating life-like movement in floating decoys comprising:
   (a) a submersible frame to which said decoys are attached by flexible lines,
   (b) an elastic band having a pre-determined elasticity anchored at one end away from said frame, said band being attached at its opposite end to said frame, and;
   (c) an electric motor having a rotatable shaft to which is attached one end of a reel line, said reel line being attached at its opposite end to said frame, and
   (d) means for turning on and off said motor at time intervals which are varied by voltage to said timers, said voltage being generated by the backspin on said motor shaft caused by the contraction of said elastic band.

5. An apparatus according to claim 4 wherein said elastic band has an elasticity characteristic sufficient to create a pulling force greater than the rotational force of said shaft.

* * * * *